(12) United States Patent
Middleton et al.

(10) Patent No.: US 6,977,691 B1
(45) Date of Patent: Dec. 20, 2005

(54) SYSTEM FOR NONLINEAR VIEWING OF TELEVISION SHOW SEGMENTS

(75) Inventors: Ryan Middleton, Plano, TX (US); Philip Thrift, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 479 days.

(21) Appl. No.: 09/639,574

(22) Filed: Aug. 14, 2000

Related U.S. Application Data

(60) Provisional application No. 60/154,956, filed on Sep. 21, 1999.

(51) Int. Cl.[7] .............................................. H04N 7/10
(52) U.S. Cl. ...................................... 348/473; 348/723
(58) Field of Search ................................ 348/473, 486, 348/467, 724, 554, 461, 723, 725; 725/20, 725/22, 34, 35, 9, 134

(56) References Cited

U.S. PATENT DOCUMENTS

| | | | |
|---|---|---|---|
| 5,243,423 A * | 9/1993 | DeJean et al. | 348/473 |
| 5,285,470 A * | 2/1994 | Schreiber | 348/384.1 |
| 5,425,100 A * | 6/1995 | Thomas et al. | 725/20 |
| 5,504,528 A * | 4/1996 | Koshiro et al. | 375/240.01 |
| 5,629,739 A * | 5/1997 | Dougherty | 348/486 |
| 5,633,683 A * | 5/1997 | Rosengren et al. | 375/240.01 |
| 5,737,025 A * | 4/1998 | Dougherty et al. | 348/473 |
| 5,737,026 A * | 4/1998 | Lu et al. | 348/473 |
| 5,774,170 A | 6/1998 | Hite et al. | |
| 5,847,771 A * | 12/1998 | Cloutier et al. | 348/564 |
| 5,999,216 A * | 12/1999 | Kaars | 375/240.1 |
| 6,002,393 A * | 12/1999 | Hite et al. | 345/719 |
| 6,026,150 A * | 2/2000 | Frank et al. | 379/90.01 |
| 6,028,599 A * | 2/2000 | Yuen et al. | 725/50 |
| 6,035,177 A * | 3/2000 | Moses et al. | 725/22 |
| 6,041,068 A * | 3/2000 | Rosengren et al. | 370/538 |
| 6,097,435 A * | 8/2000 | Stanger et al. | 375/240.03 |
| 6,285,407 B1 * | 9/2001 | Yasuki et al. | 348/554 |
| 6,301,222 B1 * | 10/2001 | Kovacevic et al. | 370/216 |
| 6,363,525 B1 * | 3/2002 | Dougherty et al. | 725/34 |
| 6,452,640 B1 * | 9/2002 | Yuen et al. | 348/460 |
| 6,453,471 B1 * | 9/2002 | Klosterman | 725/41 |
| 6,463,585 B1 * | 10/2002 | Hendricks et al. | 725/35 |
| 6,557,172 B1 * | 4/2003 | Carr | 725/139 |
| 6,574,795 B1 * | 6/2003 | Carr | 725/71 |
| 6,721,015 B2 * | 4/2004 | Yuen et al. | 348/460 |
| 2003/0133043 A1 * | 7/2003 | Carr | 348/563 |
| 2004/0045025 A1 * | 3/2004 | Ward et al. | 725/42 |

FOREIGN PATENT DOCUMENTS

| | | |
|---|---|---|
| GB | 2 313 755 | 12/1997 |
| WO | WO93/11617 | 6/1993 |
| WO | WO96/05699 | 2/1996 |
| WO | WO98/53611 | 11/1998 |

* cited by examiner

*Primary Examiner*—Paulos M. Natnael
(74) *Attorney, Agent, or Firm*—W. James Brady, III; Frederick J. Telecky, Jr.

(57) ABSTRACT

A system for nonlinear viewing of television show segments is provided by transmitting a main signal and an ancillary signal. The ancillary signal is a short show segment. The television receiver system can select either the main signal or the ancillary signal. The ancillary signal is stored in a small cache memory for later access in place of the main signal. An icon is generated on the television set to notify the user of the presence of the ancillary signal.

6 Claims, 2 Drawing Sheets

SYSTEM FOR NONLINEAR VIEWING OF TELEVISION SHOW SEGMENTS

This application claims priority under 35 USC § 119(e)(1) of provisional application No. 60/154,956, filed Sep. 21, 1999.

FIELD OF INVENTION

This invention relates to television systems, and more particularly to a television system for nonlinear viewing of television show segments.

BACKGROUND OF INVENTION

Television viewing today is linear viewing of transmitted programs. The viewer tunes to a particular channel and the program material, including advertisements, are displayed or recorded (if the viewer has a video tape recorder) in sequence. Television broadcasting includes extensive editing of program material, particularly news broadcasting to fit the programming time constraints so a lot of good material is edited out. It would be highly desirable to enable a viewer to see this material. Video On Demand (VOD) systems require significant dedicated bandwidth and server resources to send selected segments. Receiver storing of high amounts of television and other media content-requires huge storage requirements on receiver.

Broadcasters are faced with the high cost of installing High Definition Television Broadcasting Equipment with an unknown number of customers willing to pay the cost for High Definition television sets. It is, therefore, desirable to provide other ways of attracting more viewers.

SUMMARY OF INVENTION

In accordance with one embodiment of the present invention, a system for selective segment reception of broadcast television and/or caching television content is provided wherein while at a given television channel-frequency, a main signal is provided and separate television ancillary data, including television show segment, is provided and the receiver system can either store or provide the ancillary data out of the television receiver to the television display.

IN THE DRAWINGS

DETAILED DESCRIPTION

Figure 1:
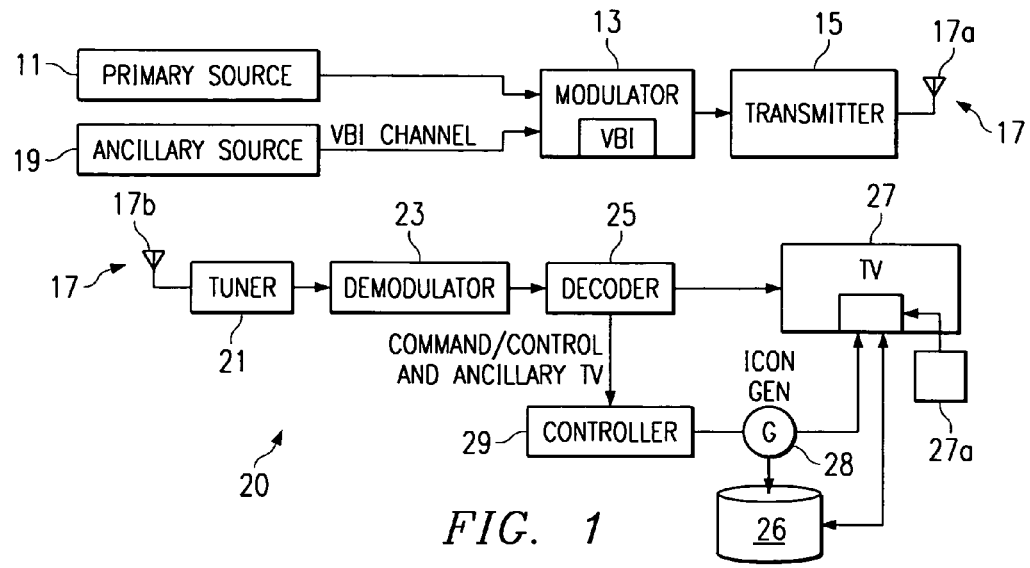
FIG. 1 is a block diagram of the system according to one embodiment of the present invention.

Referring to FIG. 1, the primary television signals from source 11 are modulated at modulator 13 and amplified and broadcasted via transmitter 15 and antenna or cable system 17. An alternate signal source 19, which may be signals including a television video show segment, are modulated at modulator 13 during, for example, the vertical blanking interval (VBI). The signals sent during the vertical blanking interval also includes data to transmit command/control signals for caching the small video segments of content from the auxiliary channel 19 in cache 26, which can include VBI or user data as well as subchannels to the main channel. The VBI signals direct the updating of the cached television content, just keeping in store what is associated with the main television show in a time window. New signals received at receiver 20 via antenna 17*a* or cable system 17 replace that stored in an earlier time window to clean up the cache 26 and to keep the storage requirement small. At the receiver end, the antenna 17*b* or cable system and tuner 21 receive the transmitted signals and the main channel signals are sent to demodulator 23 and decoder 25 to the television set with display 27. The command and/or control signals for caching control and the ancillary segment signals are provided out of demodulator 23 and decoder 25 to control 29 and the ancillary channel segment when decoded is selectively stored on disk or other memory cache 26. New signals coming in through demodulator 23 can, in one embodiment, clean-up the cache to keep the storage requirement small. The command/control signals at control 29 control the storage on cache 26. The receiver system via the control 29 can provide a television viewer interface option wherein small icons are generated at a generator 28 that appear on the television display screen 27 overlaid on top of the television show, showing the ancillary television content selectable by the viewer. This can be controlled by the command/control signals at control 29 to store in cache 26 and to generate the icons for the television set. The generator 28 generates the icon when the ancillary content is demodulated and stored in the cache 26. These are removed as content leaves the cache. The viewer has an interactive terminal 27*a* such as a mouse or keyboard on the television remote to select the icon and access the cache to the screen. The primary source and ancillary sources may encode at an encoder to convert to binary data to be modulated and the decoder 25 converts the signal back to analog signals. One example of the ancillary data is caching simultaneous camera views of a sports event, so the viewer can direct instant replay from a different angle. Another example is caching smaller videos directly related to the main show that are directly coupled in a time neighborhood with the show, e.g., Teletubies can have user-profile-based video content.

The present invention in one embodiment utilizes the Vertical Blanking Interval (VBI) to manage the content of the cache of media on the receiver, keeping the cache aligned with the content of the channel being received at the time. When the VBI occurs, the data from the ancillary source is stored with the control by the command/control signals.

The ATVEF (use hyperlink for atvef.com) specification provides Internet/VBI protocols that will support the implementation; in particular:

announcements over Session Description Protocol (SDP) triggers over User Datagram Protocol (UDP) can be utilized to transmit the control information for cache management.

Figure 2:
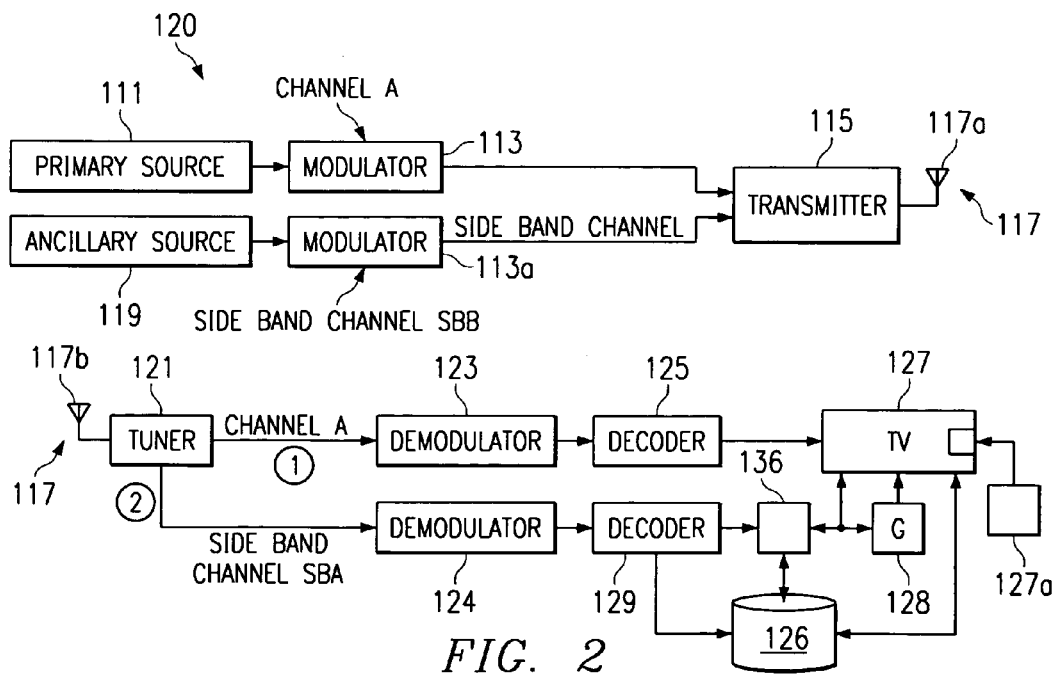
FIG. 2 is a block diagram of the system according to a second embodiment of the present invention.
Figure 3:
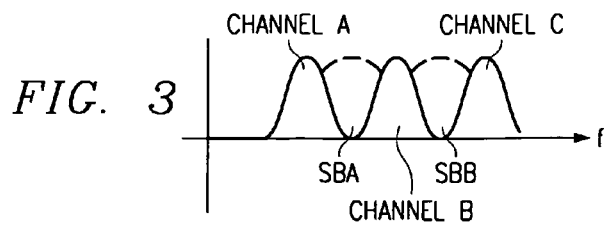
FIG. 3 illustrates transmission in the sidebands according to a second embodiment of the present invention.

In accordance with another embodiment of the present invention as illustrated in FIG. 2, the main television signal at source 111 is modulated at modulator 113 with a television channel A, for example, and transmitted by transmitter 115 via antenna 117*a* or cable system 117. The ancillary data at source 119 is modulated at modulator 113*a* to a digital data sideband carrier signal. Analog signals require sideband isolation between channels since the spectrum from one channel frequency band spills into the adjacent channel frequency bands. When the main channels are sent under data compression such as MPEG1 and MPEG2, they do not require isolation. The main primary source 111 is modulated using a data compressed modulation at modulator 113 such as MPEG1. The ancillary source 19 data and command/control signals are sent between the data compressed MPEG channels, such as between channel A and B, in accordance with this other embodiment. As illustrated in FIG. 3, between the 6 mHz channels A, B and C are sideband channels S.B.A. and S.B.B. normally kept for isolation. The sideband channel carries the ancillary data and command/controls while the primary source is sent using compressed digital data with low spill over. Similar sideband communication system is provided by U.S.A. Digital Radio for radio as described, for example, in Hunsinger et.al. U.S. Pat. No. 5,745,525. This patent is incorporated herein by reference. The receiver 120 receives the main signal at the channel A carrier and provides the main signal through the tuner 121 to the demodulator 123 and decoder 125 to the television set 127. The sideband channel SBA is coupled out of port 2 to demodulator 124. At decoder 129 are detected the command and control signals that are used to store the ancillary signal at cache storage 126 under control of controller 129. Controller 136 controls the sideband signals stored in cache storage 126 and input into the television set 127. An icon generator 128 is responsive to the storage of the selected sideband channel in cache 126 to provide an icon on the display screen of television set 127 for selection by selection control 127a to select the stored cache signal sent on the sideband channel in place of the main signal. The decoder 125 also converts when applicable digital signals to an analog for the television set 127.

Figure 4:
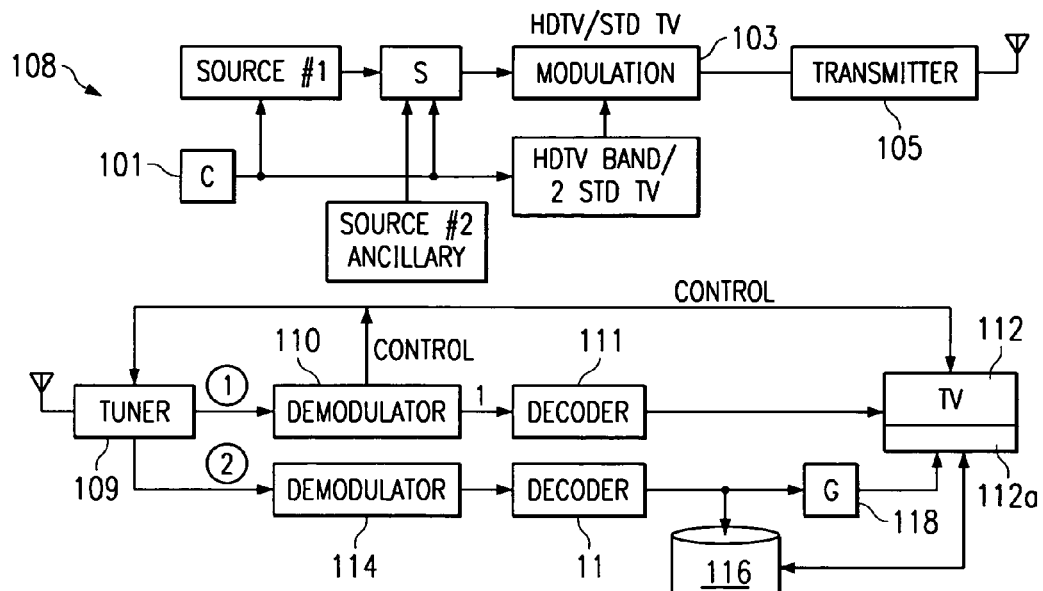
FIG. 4 illustrates switching between high revolution to standard resolution screens at the same time to provide ancillary data.

In accordance with another embodiment as shown in FIG. 4, one high definition television channel can be split by a control 101 into two channels (source #1 and source #2) with each carrying, for example, half high definition television information. The modulator 103 receives two adjacent standard carrier frequency signals or one high definition carrier signal for modulation and transmitter 105 transmits over either the high definition channel frequency band or two adjacent lower or standard frequency bands. High definition signals from source #1 can be switched at switch S so source #1 is switched to reduce the bandwidth, for example, in half and also add an adjacent channel source #2 at adjacent frequency band and command/controls at reduced bandwidth within the high definition band. At the receiver 108, the tuner 109 is switched to the two channel modes such that the demodulator 110 converts the half band signals and provides source #1, for example, to the TV receiver 112 through decoder 111. The ancillary channel (source #2 for the example) and command/control is provided at port 2 to demodulator 114. The decoders convert digital signals to analog and decoder 115 detects and provides the necessary command/control signals and includes the controller. The controller provides the control signals to perform the storage and erase functions (memory control) and signal to icon generator 118. The interactive user selects the ancillary programs by selector 112a. The output is either stored in cache 116 or switched to TV 112. During program content such as news, two programs can be sent over the single high definition channel with each 188 Bytes with a first set of 188 Bytes sending, for example, the main program (for example, source #1) and the second set of 188 Bytes sending the ancillary data of, for example, more detail about a segment of the news program. For example, when a main program leaves a segment on Kosovo and goes on to discuss the weather and the viewer wants more information on Kosovo, the viewer can select to receive an ancillary program on Kosovo or store the ancillary program segment on Kosovo in the cache disk 116.

Figure 5:
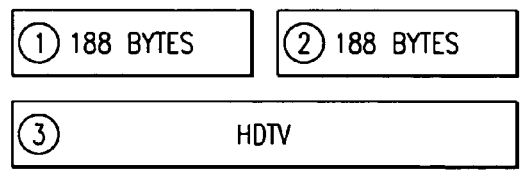
FIG. 5 illustrates full high definition TV bandwidth and alternate 188 Byte bandwidth.

Referring to FIG. 5, the standard resolution digital broadcast for television is 188 Bytes and fits in the bandwidth of half the high resolution television bandwidth. The system can select to transmit, for example, full high resolution program material for sports events, for example, but switch to lower resolution for selected segments of news broadcasts so viewer can select ancillary data such as more on Kosovo or alternate views of a replay of the sports event. The alternate 188 Bytes is represented by selections 1 and 2 and selection 3 represents the high definition broadcast.

Figure 6:
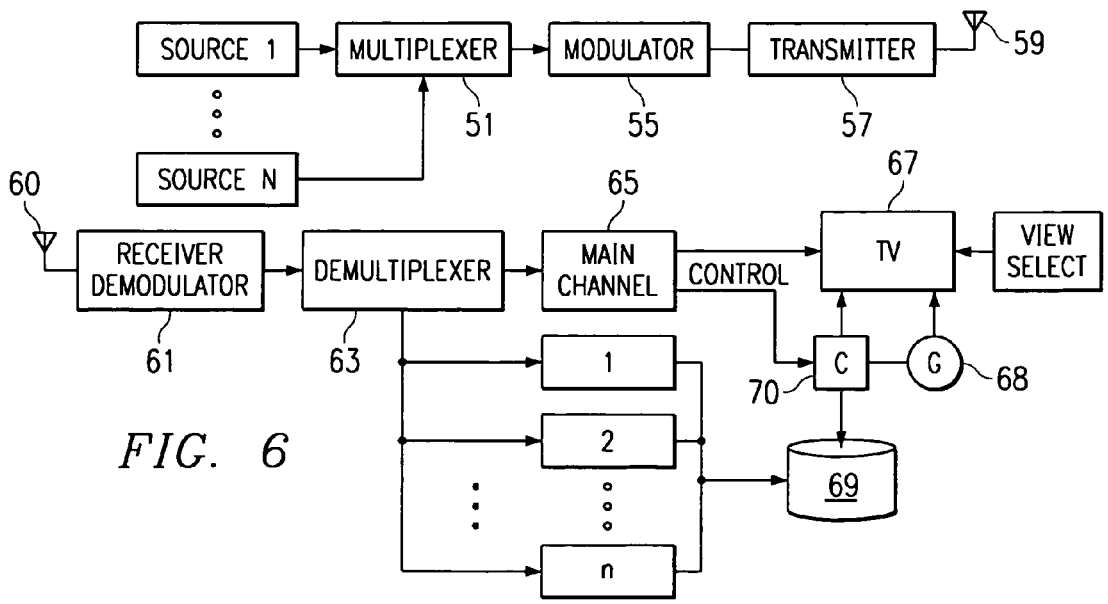
FIG. 6 illustrates another embodiment of the present invention using multiplexed channels.

In accordance with another embodiment of the present invention as illustrated in FIG. 6 a television channel is split into several subchannels of time multiplexed signals. The main subchannel can be viewed with subchannels cached in the system. Control data embedded in the main subchannel provides commands for updating (removing old subchannel segments and storing new ones). The cached subchannels may be selected by the viewer to see additional video associated with the main subchannel, such as a different perspective of a football game. Referring to FIG. 6, the n sources are time multiplexed at multiplexer 51 with source 1 (main channel) on most of the time and only short segments provided the other sources. The signals are modulated at modulator 55 and transmitted via transmitter 51 and antenna or cable 59. The received signal at antenna or cable end 60 is demodulated at demodulator 61 and applied to de-multiplexer 63. The main signal from source 1 is provided to the television set 67 via channel 65 and the separate time spaced channels are stored in separate cache memories on disk 69 or on separate RAM memories. The storage of the signals from the sources 2 through n at the separate cache memories is indicated by the generation of icons at generator 68. The command/control is provided from the main channel signals to controller 70 that controls the storage, icon generation and access. When the viewer selects a stored segment by a keyboard entry or mouse click on the icon, the controller 709 fetches the proper cache location. The cache stores only the most recent data information and overwrites the old.

The command and control signals in the embodiment can be sent in the main channel or any other channel.

What is claimed is:

1. A system for nonlinear viewing of television segments comprising:
    a television broadcast transmitter including means for generating and transmitting main uncompressed broadcast television signals and separate ancillary uncompressed broadcast television signals with separate television show segment related to said main television signals;
    a television receiver system for receiving said main television signals and for receiving and storing in a cache memory the uncompressed broadcast ancillary television signal including the separate television show segment; and
    selective means at the television receiver for providing either the uncompressed broadcast main television signals or the uncompressed broadcast ancillary television signals with the separate television show segment to a display of said television receiver said television signals are transmitted over a digital television channel subdivided into several subchannels of multiplexed signals and wherein one of said subchannels contains said main uncompressed broadcast television signals and the other subchannels provide ancillary uncompressed broadcast signals; said main uncompressed broadcast subchannel carries the control data for updating and removing old subchannel segments and storing new ones.

2. The system of claim 1 including means for generating an icon on a television receiver display indicating the presence of the stored uncompressed broadcast ancillary signals and means at the television receiver for accessing said store signal in said cache memory using said icon.

3. A system for nonlinear viewing of television segments comprising:

- a television broadcast transmitter including means for generating and transmitting main uncompressed broadcast television signals and separate ancillary uncompressed broadcast television signals with separate television show segment related to said main television signals:
- a television receiver system for receiving said main television signals and for receiving and storing in a cache memory the uncompressed broadcast ancillary television signal including the separate television show segment; and
- selective means at the television receiver for providing either the uncompressed broadcast main television signals or the uncompressed broadcast ancillary television signals with the separate television show segment to a display of said television receiver said television signals are transmitted over a digital television channel subdivided into several subchannels of multiplexed signals and wherein one of said subchannels contains said main uncompressed broadcast television signals and the other subchannels provide ancillary uncompressed broadcast signals; said separate uncompressed broadcast ancillary television signal contains short television signal segments related to the main uncompressed broadcast signals and said cache stores said segments and said main uncompressed broadcast signals and contains control data providing means for removing and storing said segments and said receiver system includes means responsive to said control data for storing said segments and removing said short segments from said cache memory.

4. A system for nonlinear viewing of television segments comprising:

- a television broadcast transmitter including means for generating and transmitting main uncompressed broadcast television signals and separate ancillary uncompressed broadcast television signals with separate television show segment related to said main television signals;
- a television receiver system for receiving said main television signals and for receiving and storing in a cache memory the uncompressed broadcast ancillary television signal including the separate television show segment; and
- selective means at the television receiver for providing either the uncompressed broadcast main television signals or the uncompressed broadcast ancillary television signals with the separate television show segment to a display of said television receiver; said main uncompressed broadcast signals and ancillary uncompressed broadcast signals are different parts of a high definition uncompressed broadcast television signal.

5. The system of claim 4 including means for switching between high definition uncompressed broadcast television channel and one standard uncompressed broadcast television channel and an uncompressed broadcast ancillary channel.

6. The system of claim 5 including means for generating an icon on a television receiver display indicating the presence of the stored uncompressed broadcast ancillary signals and means at the television receiver for accessing said store signal in said cache memory using said icon.

* * * * *